(12) United States Patent
Prout

(10) Patent No.: US 10,935,314 B2
(45) Date of Patent: Mar. 2, 2021

(54) HEATING VALUES OF CELLULOSIC WASTE

(71) Applicant: Evan Prout, Baton Rouge, LA (US)

(72) Inventor: Evan Prout, Baton Rouge, LA (US)

(*) Notice: Subject to any disclaimer, the term of this patent is extended or adjusted under 35 U.S.C. 154(b) by 54 days.

(21) Appl. No.: 16/360,532

(22) Filed: Mar. 21, 2019

(65) Prior Publication Data
US 2020/0300462 A1 Sep. 24, 2020

(51) Int. Cl.
F26B 3/00 (2006.01)
F26B 5/00 (2006.01)
F23G 5/04 (2006.01)
F23G 7/02 (2006.01)

(52) U.S. Cl.
CPC ............ *F26B 5/005* (2013.01); *F23G 5/04* (2013.01); *F23G 7/02* (2013.01); *F23G 2201/60* (2013.01); *F23G 2209/103* (2013.01); *F23G 2900/50401* (2013.01)

(58) Field of Classification Search
CPC .... F23G 5/04; F23G 7/02; F23G 2900/50401; F23G 2209/103; F23G 2201/60; F23G 2201/20; F23G 2201/603; F26B 5/005
USPC ... 34/397, 398, 400, 82, 340, 329, 330, 337, 34/338, 339
See application file for complete search history.

(56) References Cited

U.S. PATENT DOCUMENTS

| | | | | |
|---|---|---|---|---|
| 4,290,269 A * | 9/1981 | Hedstrom | ................. | F23G 5/04 110/221 |
| 5,782,982 A | 7/1998 | Farone et al. | | |
| 5,788,812 A * | 8/1998 | Agar | ................. | C07D 307/50 162/16 |
| 6,375,853 B1 * | 4/2002 | Yoon | ................. | C01B 17/0205 209/5 |
| 6,977,066 B1 * | 12/2005 | Iwanaga | ................. | C01B 7/04 423/502 |
| 9,702,049 B1 * | 7/2017 | Parker | ................. | C25B 1/24 |
| 2003/0051367 A1 * | 3/2003 | Griffin | ................. | F26B 5/005 34/132 |
| 2004/0121436 A1 * | 6/2004 | Blount | ................. | C12P 7/08 435/161 |
| 2010/0330633 A1 * | 12/2010 | Walther | ................. | C12M 45/06 435/150 |
| 2011/0060132 A1 * | 3/2011 | Lewis | ................. | C13K 1/02 530/412 |
| 2012/0144687 A1 * | 6/2012 | Yeom | ................. | D06F 58/04 34/82 |

(Continued)

FOREIGN PATENT DOCUMENTS

| | | |
|---|---|---|
| CN | 102409572 | 4/2012 |
| GB | 2285979 | 8/1995 |

OTHER PUBLICATIONS

International Application No. PCT/US2020/023898, International Search Report and Written Opinion, dated Jul. 1, 2020, 11 pages.

*Primary Examiner* — John P McCormack
(74) *Attorney, Agent, or Firm* — Kilpatrick Townsend & Stockton LLP

(57) ABSTRACT

Provided herein is a process for improving the heating value of a cellulosic waste material. The process includes the steps of treating the cellulosic waste material with an acid solution, recovering heat produced by treating the cellulosic waste material, and filtering the treated cellulosic waste material to produce a filter cake. The disclosure also relates to a system for implementing the process.

19 Claims, 1 Drawing Sheet

(56) References Cited

U.S. PATENT DOCUMENTS

| | | | |
|---|---|---|---|
| 2014/0162345 A1* | 6/2014 | Eyal | D21H 11/00 |
| | | | 435/253.6 |
| 2014/0248676 A1* | 9/2014 | Griffin | C12P 3/00 |
| | | | 435/165 |
| 2015/0025229 A1 | 1/2015 | Sudhakaran et al. | |
| 2015/0315203 A1* | 11/2015 | Gebbie | A61P 11/06 |
| | | | 514/282 |

\* cited by examiner

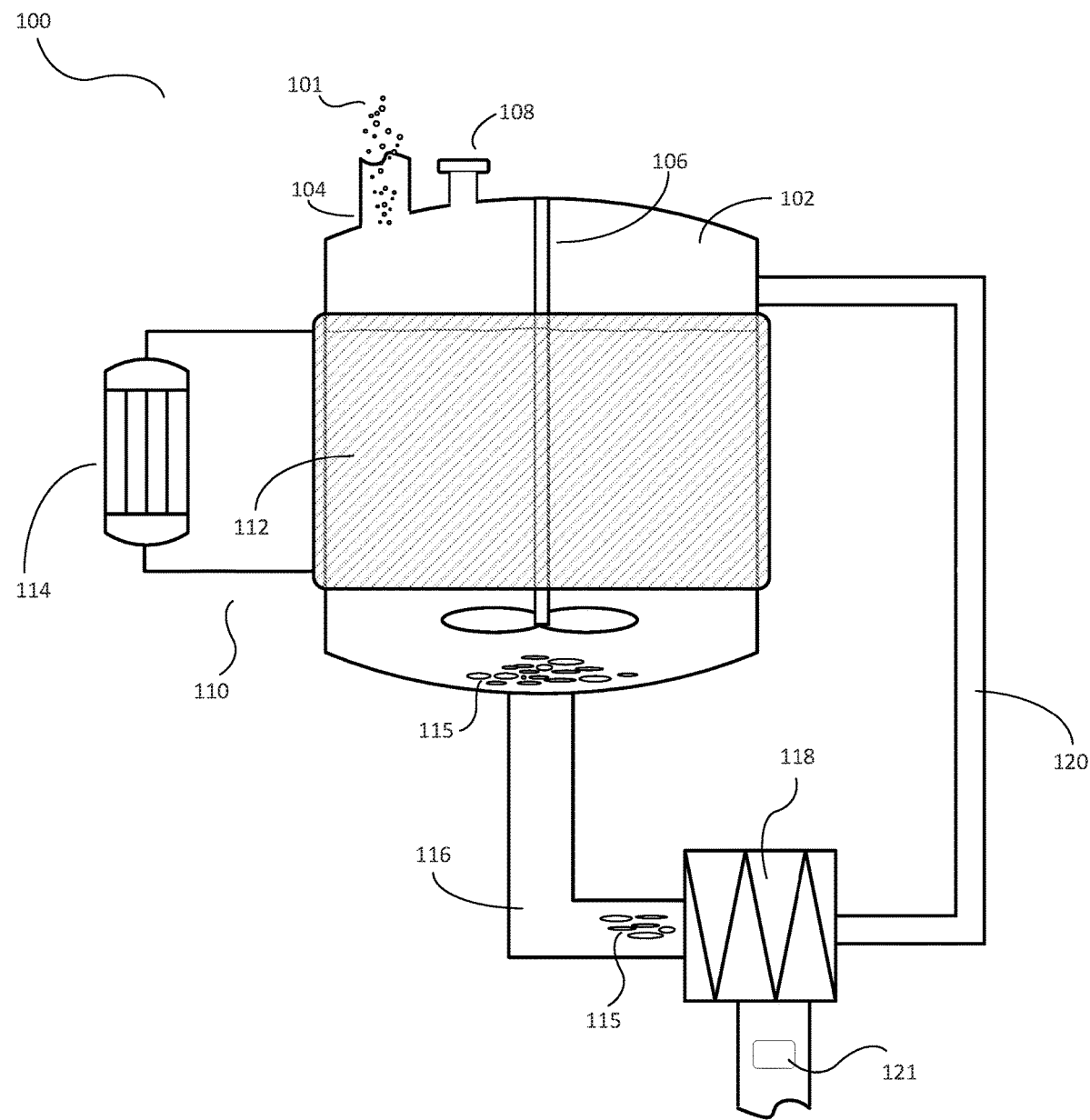

HEATING VALUES OF CELLULOSIC WASTE

FIELD OF INVENTION

The present disclosure relates general to methods and systems for treating and processing cellulose-containing materials. These methods and systems are useful for treating cellulose-containing materials produced as waste, e.g., bagasse.

BACKGROUND

The heating value of a substance, e.g., a fuel source, refers to the amount of heat energy released during the combustion of that substance. The heating values of common fuels can vary widely, and generally fuel sources with higher heating values are desirable because they release greater amounts of energy, which can be collected and utilized in various applications. In developing new fuel sources, particularly renewable fuel sources, it is important to ensure that the source has a high heating value.

One possible fuel source is cellulose-based waste materials, which are produced as waste in various manufacturing processes that involve plant matter. For example, large amounts of cellulosic waste material are produced in the production and refinement of sugar from sugar cane. This material, often termed bagasse, largely comprises the cellulosic remnant of the sugar cane stalk as well as other plant matter, e.g., hemicellulose and lignin. In conventional sugar production and refinement facilities, stockpiled bagasse is partially dried and burned as a fuel source. But the high residual water content of bagasse reduces its heating value and therefore reduces its value as a fuel source. In order to maximize the usefulness of this waste product and thereby produce a marketable, renewable fuel source, the heating value must be improved.

The need therefore exists for a process for improving the heating value of cellulosic waste materials as well as for systems suitable for implementing that process.

SUMMARY

According to one embodiment, the present disclosure relates to a process for improving heating values of a cellulosic waste material, the process comprising the steps of treating the cellulosic waste material with an acid solution in a treatment vessel to form treated cellulosic waste material, recovering heat produced by the treating of the cellulosic waste material, and filtering the treated cellulosic waste material in a filtration device to form a filter cake. In some aspects of the process, the filtering steps separates recovered acid, and the process further comprises the step of recycling the recovered acid to the treatment vessel. In some aspects, the process further comprises the step of venting steam from the treatment vessel. In some aspects, the process further comprises the step of washing the filter cake. In some aspects, the process further comprises the step of combusting the filter cake. In some aspects of the process, the acid solution comprises hydrochloric acid, nitric acid, sulfuric acid, sulfur trioxide, disulfuric acid, hydrobromic acid, hydroiodic acid, perchloric acid, or chloric acid, or mixtures thereof. In some aspects of the process, the acid solution comprises an at least 14 molar solution of sulfuric acid and/or sulfur trioxide. In some aspects of the process, the treating step occurs at a temperature greater than 300 F. In some aspects of the process, the recovering step further comprises the steps of storing heat produced by the treating of the cellulosic waste material and removing the stored heat with a heat exchanger. In some of those aspects of the process, the treatment vessel comprises a molten salt jacket that performs the storing step. In others of those aspects, the treatment vessel comprises a circulating brine that performs the storing step. In some aspects of the process, the treated cellulosic waste material comprises an allotrope of carbon. In some aspects of the process, the filtration device comprises a filter-press.

The present disclosure also relates to a system for improving heating values of a cellulosic waste material, the system comprising a treatment vessel for treating the cellulosic waste material with an acid solution, the treatment vessel comprising a heat recovery element; a filtration device in fluid communication with the treatment vessel for separating a filter cake from a recovered acid solution; and an acid recovery component in fluid communication with the filtration device and the treatment vessel for recycling the recovered acid solution from the filtration device to the treatment vessel. In some aspects, the system further comprises an air injector for combusting the filter cake. In some aspects of the system, the treatment vessel further comprises an agitator. In some aspects of the system, the heat recovery element comprises a molten salt jacket. In some aspects of the system, the heat recovery element comprises a circulating brine. In some aspects of the system, the filtration device comprises a filter press. In some aspects of the system, the filtration device comprises a corrosion resistant polymer material selected from the group consisting of polyethylene, polypropylene, polytetrafluoroethylene, perfluoroalkoxy alkanes, and polyvinylidene fluoride, and mixtures thereof.

BRIEF DESCRIPTION OF THE DRAWINGS

Embodiments are described in detail below with reference to the appended drawings, wherein like numerals designate similar parts.

FIG. 1 illustrates a scheme of an exemplary system for implementing a process for improving the heating value of cellulosic waste material.

DETAILED DESCRIPTION

Introduction

The present application relates to a process for improving the heating values of cellulosic waste material as well as to systems suitable for implementing the process. This process comprises several steps, including treating the cellulosic waste material with an acid solution, recovering heat produced by the treating of the cellulosic waste material, and filtering the treated cellulosic waste material to produce a filter cake. In some embodiments, the process comprises additional steps, such as recycling acid solution recovered in filtering the treated cellulosic waste material, venting steam, and/or washing the filter cake. In some embodiments, the process further comprises the additional step of combusting the filter cake. Because both free and chemical bound water has been removed, the filter cake has a greater heating value than that of the cellulosic waste material.

Cellulosic Waste Material

The cellulosic waste material may be any composition that comprises cellulose or its derivatives as primary components. In some embodiments, the cellulosic waste material may comprise cellulose alone, i.e., 100 wt. % cellulose. In some embodiments, the cellulosic waste material may comprise cellulose in an amount less than 100 wt. %, e.g., less than 80 wt. %, less than 75 wt. %, less than 60 wt. %, or less than 55 wt. %. In terms of lower limits, the cellulosic waste material may comprise cellulose in an amount greater than 30 wt. %, e.g., greater than 35 wt. %, greater than 40 wt. %, or greater than 45 wt. %. In terms of ranges, the cellulosic waste material may comprise cellulose in an amount from 30 wt. % to 100 wt. %, e.g., from 30 wt. % to 80 wt. %, from 30 wt. % to 75 wt. %, from 30 wt. % to 60 wt. %, from 30 wt. % to 55 wt. %, from 35 wt. % to 100 wt. %, from 35 wt. % to 80 wt. %, from 35 wt. % to 75 wt. %, from 35 wt. % to 60 wt. %, from 35 wt. % to 55 wt. %, from 40 wt. % to 100 wt. %, from 40 wt. % to 80 wt. %, from 40 wt. % to 75 wt. %, from 40 wt. % to 60 wt. %, from 40 wt. % to 55 wt. %, from 45 wt. % to 100 wt. %, from 45 wt. % to 80 wt. %, from 45 wt. % to 75 wt. %, from 45 wt. % to 60 wt. %, or from 45 wt. % to 55 wt. %.

In some embodiments, the cellulosic waste material may comprise additional components, such as hemicellulose, lignin, or wax. In these embodiments, the cellulosic waste material may comprise hemicellulose in an amount from 10 wt. % to 50 wt. %, e.g., from 10 wt. % to 40 wt. %, from 10 wt. % to 35 wt. %, from 10 wt. % to 30 wt. %, from 10 wt. % to 25 wt. %, from 15 wt. % to 50 wt. %, from 15 wt. % to 40 wt. %, from 15 wt. % to 35 wt. %, from 15 wt. % to 30 wt. %, from 15 wt. % to 25 wt. %, from 20 wt. % to 50 wt. %, from 20 wt. % to 40 wt. %, from 20 wt. % to 35 wt. %, from 20 wt. % to 30 wt. %, or from 20 wt. % to 25 wt. %. In these embodiments, the cellulosic waste material may comprise lignin in an amount from 10 wt. % to 30 wt. %, e.g., from 10 wt. % to 28 wt. %, from 10 wt. % to 25 wt. %, from 10 wt. % to 22 wt. %, from 15 wt. % to 30 wt. %, from 15 wt. % to 28 wt. %, from 15 wt. % to 25 wt. %, from 15 wt. % to 22 wt. %, from 18 wt. % to 30 wt. %, from 18 wt. % to 28 wt. %, from 18 wt. % to 25 wt. %, or from 18 wt. % to 22 wt. %. In these embodiments, the cellulosic waste material may comprise ash in an amount less than 10 wt. %, e.g., less than 8 wt. %, less than 5 wt. %, or less than 4 wt. %. In these embodiments, the cellulosic waste material may comprises wax in an amount less than 3 wt. %, e.g., less than 2 wt. % or less than 1 wt. %.

In some embodiments, the cellulosic waste material further comprises water. In these embodiments, the cellulosic waste material may comprise water in an amount ranging from 20 wt. % to 80 wt. %, e.g., from 20 wt. % to 70 wt. %, from 20 wt. % to 60 wt. %, from 20 wt. % to 60 wt. %, from 20 wt. % to 5 wt. %, from 30 wt. % to 80 wt. %, from 30 wt. % to 70 wt. %, from 30 wt. % to 60 wt. %, from 30 wt. %, to 60 wt. %, from 30 wt. % to 50 wt. %, from 40 wt. % to 80 wt. %, from 40 wt. % to 70 wt. %, from 40 wt. % to 60 wt. %, from 40 wt. %, to 60 wt. %, or from 40 wt. % to 50 wt. %.

In preferred embodiments, the cellulosic waste material comprises bagasse.

Treating Step; Treatment Vessel

In the treating step, the cellulosic waste material is treated with an acid solution in a treatment vessel. During the treating step, the acid solution reacts with water in the cellulosic waste material to dry the cellulosic waste material. The acid solution also reacts with the components of the cellulosic waste material to chemically dehydrate the cellulosic waste material. Said another way, during the treating step, both free and bound water is removed from the cellulosic waste material. These reactions are exothermic and produce great amounts of heat.

The composition of the acid solution is not particularly limited and may comprise any strong acid capable of dehydrating the cellulosic waste material. Examples of suitable acid solutions include solutions of hydrochloric acid, nitric acid, sulfuric acid, sulfur trioxide, disulfuric acid, hydrobromic acid, hydroiodic acid, perchloric acid, and chloric acid, and mixtures thereof. The differing properties of these and other suitable acid solutions, such as differing acid strength, vapor pressure, reactivity, are known to those of skill in the art; furthermore, those of skill in the art would understand how to make conventional changes necessary to ensure full utilization of the selected acid solution or solutions. In preferred embodiments, the acid solution comprises sulfuric acid, sulfur trioxide, or disulfuric acid, or mixtures thereof.

In some embodiments, the acid solution has a pH less than 2, e.g., less than 1.8, less than 1.5, less than 1.0, or less than 0.5. In some embodiments, the acid solution comprises a strong acid at a molarity greater than 14 molar, e.g., greater than 15 molar, greater in the 18 molar, or greater than 20 molar.

As noted above, the dehydration reactions that occur during the treating step are exothermic. As such, these reactions typically occur at ambient temperature, i.e., at room temperature. The dehydration reactions can be accelerated and the efficiency of the overall process can be improved, however, by raising the temperature of the mixture in the treatment vessel using any standard means of adjusting temperature. In some embodiments, the treating step occurs at a temperature greater than 300° F., e.g., greater than 325° F., greater than 350° F., greater than 375° F., greater than 400° F., or greater than 500° F.

The structure of the treatment vessel is not particularly limited, and any conventional reactors suitable for use in the processes disclosed herein may be utilized. For example, conventional batch reactors or continuous stirred-tank reactors may be as the treatment vessel. As discussed below, the treatment vessel further comprises a heat recovery element. In some embodiments, the treatment vessel may comprise an agitator to improve the efficiency of the treating step.

Due to the use of strong acids and high temperatures, the treatment vessel is preferably composed of materials resistant to corrosion and heat. In some embodiments, the treatment vessel is composed of a metal substance. Because most metals are particularly susceptible to corrosion, however, care should be taken to control the water content in the treatment vessel or to monitor corrosion of any components in these embodiments. In preferred embodiments, the treatment vessel is composed of glass, which more readily resists the effects of corrosion and heat.

By treating the cellulosic waste material in this way, both chemically bound and free water in the cellulosic waste material can be removed. The result is a treated cellulosic waste material comprising one or more allotropes of carbon, e.g., graphite or amorphous carbon.

Heat Recovering Step; Heat Recovery Element

As noted above, the dehydration reactions that occur during the treating step are exothermic and produce great amounts of heat. In the heat recovering step, at least a portion of the heat produced by the treating of cellulosic waste material is recovered.

The means of heat recovery is not particularly limited. In preferred embodiments, the treatment vessel comprises a heat recovery element. In some preferred embodiments, the heat recovery element may comprise a molten salt jacket, i.e., a structure surrounding the treatment vessel and containing a molten salt or a solution of molten salt. In these embodiments, the molten salt takes up and stores at least a portion of the heat produced in the treating step. This stored heat can then be removed by a heat exchanger. In other preferred embodiments, the heat recovery element may comprise a circulating brine, i.e., a structure surrounding the treatment vessel and containing a brine solution which is controlled by a pump. The brine solution preferably has a high boiling point, such that it can take up and store at least a portion of the heat produced without vaporizing. The heated brine solution is pumped to a heat exchanger, which removes the heat from the brine solution, i.e., cools the brine solution. The cooled brine solution is then pumped back to the treatment vessel to recover more heat in a continuous loop. Other conventional temperature control systems may also be used in the heat recovering step.

In some embodiments, the heat recovered in this step is used to maintain the temperature of the of the mixture in the treatment vessel. In other embodiments, the recovered heat may be used to generate electricity by, for example, generating steam to spin the turbine of a generator.

Filtering Step; Filtration Device; Acid Recovery Component

After having been treated with the acid solution in the treatment vessel, the treated cellulosic waste material is subjected to the filtering step. In the filtering step, treated cellulosic waste material is filtered in a filtration device to produce a filter cake. During the filtering step, the treated cellulosic waste material is separated from the acid solution. In some embodiments, the process may further comprise the step of recycling the acid solution recovered during the filtering step to the treatment vessel.

The filtration device is in fluid communication with the treatment vessel. For example, the treated cellulosic waste material may be pumped from the treatment vessel to the filtration device through piping. As discussed above with regard to the treatment vessel, such piping must be resistant to the corrosion and heat. Furthermore, as noted above, the selection of acid solution may affect the material to be used in the piping. The piping is preferably composed of a material compatible with the chemistry of the process, e.g., the acidity and temperature. In some preferred embodiments, the piping joining the treatment vessel and the filtration device is composed of glass. In other preferred embodiments, the piping is composed of conventional materials and is lined with a corrosion resistant material, e.g., lined with polyethylene, polypropylene, polytetrafluoroethylene, perfluoroalkoxy alkanes, and polyvinyl fluoride, and combinations thereof.

The structure of the filtration device is not particularly limited, and any conventional filtration devices suitable for use in the processes disclosed herein may be utilized. In some embodiments, the filtration device comprises a filter press, such as a plate and frame filter press, a recessed plate filter press, or a membrane filter press. Various filter presses suitable for the separation of solids and liquids are known in the art and generally operate by manipulating pressure drive.

In preferred embodiments, the filtration device comprises a plate and frame filter press. The structure of plate and frame filter presses is known to those of skill in the art. Typical plate and frame filter presses comprise many filter plates and frames assembled alternately, each frame being separated from adjacent filter plates by filter cloths.

Due to the use of strong acids, the filtration device is preferably composed of materials resistant to corrosion. In preferred embodiments, the filtration device is composed of a corrosion resistant polymer material. Suitable examples of corrosion resistant polymer materials include polyethylene, polypropylene, polytetrafluoroethylene, perfluoroalkoxy alkanes, and polyvinyl fluoride, and combinations thereof.

As noted above, during the filtering step, the treated cellulosic waste material is separated from the acid solution. This acid solution can be reused to treat additional cellulosic waste material. Therefore, preferred embodiments of the process further comprise the step of recycling recovered acid solution. In these embodiments, an acid recovery component, which is in fluid communication with both the filtration device and the treatment vessel, recovers acid solution separated from the treated cellulosic waste material during the filtering step and recycles the recovered acid solution to the treatment vessel. Suitable structures for the acid recovery component are known in the art and can be as simple as piping and pumps.

By removing the recovered acid solution in the filtering step, a filter cake can be produced. As noted above, the filter cake comprises an allotrope of carbon, e.g., graphite or amorphous carbon. Because both the free and bound water from the cellulosic waste material has been removed to produce the filter cake has an improved heating value relative to the cellulosic waste material, e.g., a greater heating value. As such, the filter cake material may be used as a more efficient energy source.

In some embodiments, the filter cake may be subjected to further downstream processing, e.g., washing, shaping, or packaging.

Additional Steps

As noted above, the process for improving heating values of cellulosic waste materials may comprise additional steps. In some embodiments, the process further comprises the step of preparing the cellulosic waste material for treatment. Although it is contemplated that cellulosic waste material in any form can be subjected to the treating step, the efficiency of the treating step can be improved by preparing the cellulosic waste material prior to treating. For example, in some embodiments, the cellulosic waste material may be subjected to a milling and/or grinding step before being added to the treatment vessel.

In some embodiments, the processes further comprises the step of venting steam from the treatment vessel. The free and bound water that is removed from the cellulosic waste materials during the treating step can dilute the acid solution, reducing the efficiency of the reactions. It is therefore desirable to withdraw the water from the treatment vessel. Due to the high temperatures within the reaction vessel, much of the water will vaporize, and so the water can be removed by venting the steam. In some embodiments, the steam further comprises acid solution. In these embodiments, the amount of acid solution present in the stream may vary, based on the composition of the acid solution. Depending on the amount of acid therein, the steam can be condensed and repurposed for other used in the process. In some embodiments, the vented steam may be used to generate electricity by, for example, spinning the turbine of a generator.

In some embodiments, the process further comprises the step of washing the filter cake. Although the treated cellulosic waste material and acid solution are separated during the filtering step to produce the filter cake, the filter cake may remain partially coated with the acid solution. For example, the inventor has found that, in embodiments where the acid solution sulfuric acid, sulfur trioxide, and/or disulfuric acid, trace amounts of sulfur may be present in the filter cake. This is problematic, as the presence of sulfur can reduce the heating value of the sulfuric acid and/or limit the usefulness of the filter cake. It is therefore desirable to wash the filter cake, e.g., by rinsing with water or another solvent.

In some embodiments, the process further comprises the step of combusting the filter cake. Because the filter cake comprises an allotrope of carbon as a primary component, it can be oxidized, e.g., burned, to produce carbon dioxide and/or carbon monoxide. The oxidation of the filter cake is exothermic and releases a great deal of heat energy, which may be recovered and used to generate electricity by, for example, generating steam to spin the turbine of a generator. Because the filter cake has an improved, e.g., greater, heating value than the cellulosic waste material, the oxidation of the filter cake releases a greater amount of heat energy than would the direct oxidation, e.g., burning, of the cellulosic waste material. In these embodiments, the oxidation of the filter cake is facilitated by an air injector, which allows for fuller combustion of the filter cake.

Exemplary Configuration

FIG. 1 shows the scheme of an exemplary system 100 suitable for implementing an embodiment of the process for improving heating values of cellulosic waste material, disclosed herein. The system 100 comprises a treatment vessel 102, a filtration device 118, and an acid recovery component 120. Cellulosic waste material 101 can be added into the treatment vessel through a feed port 104. The treatment vessel 102 comprises an agitator 106 to mix the cellulosic waste material 101 with the acid solution and a vent 108 to release steam. The treatment vessel 102 also comprises a heat recovery element 110, which further comprises molten salt jacket 112 surrounding the treatment vessel 102 and a heat exchanger 114. The acid solution reacts with the cellulosic waste material 101 in the treatment vessel to produce treated cellulosic waste material 115. The treat cellulosic waste material then passes through piping 116 to the filtration device 118. In the filtration device 118, recovered acid solution is separated from the treated cellulosic waste material 115 to produce a filter cake 121. The acid recovery component 120 then recycles the recovered acid solution from the filtration device 118 to the treatment vessel 102.

What is claimed is:

1. A process for improving heating values of a cellulosic waste material, the process comprising the steps of:
    treating the cellulosic waste material with an acid solution in a treatment vessel to form treated cellulosic waste material;
    recovering heat produced by the treating of the cellulosic waste material; and
    filtering the treated cellulosic waste material in a filtration device to form a filter cake;
    wherein the treated cellulosic waste material comprises an allotrope of carbon.

2. The process of claim 1, wherein the filtering step separates recovered acid, the process further comprising the step of recycling the recovered acid to the treatment vessel.

3. The process of claim 1, further comprising the step of venting steam from the treatment vessel.

4. The process of claim 1, further comprising the step of washing the filter cake.

5. The process of claim 1, further comprising the step of combusting the filter cake.

6. The process of claim 1, wherein the acid solution comprises hydrochloric acid, nitric acid, sulfuric acid, sulfur trioxide, disulfuric acid, hydrobromic acid, hydroiodic acid, perchloric acid, or chloric acid, or mixtures thereof.

7. The process of claim 1, wherein the acid solution comprises an at least 14 molar solution of sulfuric acid and/or sulfur trioxide.

8. The process of claim 1, wherein the treating step occurs at a temperature greater than 300° F.

9. The process of claim 1, wherein the recovering step further comprises the steps of storing heat produced by the treating of the cellulosic waste material and removing the stored heat with a heat exchanger.

10. The process of claim 9, wherein the treatment vessel comprises a molten salt jacket that performs the storing step.

11. The process of claim 9, wherein the treatment vessel comprises a circulating brine that performs the storing step.

12. The process of claim 1, wherein the filtration device comprises a filter-press.

13. A system for improving heating values of a cellulosic waste material, the system comprising:
    a treatment vessel for treating the cellulosic waste material with an acid solution, the treatment vessel comprising a heat recovery element;
    a filtration device in fluid communication with the treatment vessel for separating a filter cake from a recovered acid solution; and
    an acid recovery component in fluid communication with the filtration device and the treatment vessel for recycling the recovered acid solution from the filtration device to the treatment vessel;
    wherein the acid solution comprises an at least 14 molar solution of a strong acid.

14. The system of claim 13, further comprising an air injector for combusting the filter cake.

15. The system of claim 13, wherein the treatment vessel further comprises an agitator.

16. The system of claim 13, wherein the heat recovery element comprises a molten salt jacket.

17. The system of claim 13, wherein the heat recovery element comprises a circulating brine.

18. The system of claim 13, wherein the filtration device comprises a filter press.

19. The system of claim 13, wherein the filtration device comprises a corrosion resistant polymer material selected from the group consisting of polyethylene, polypropylene, polytetrafluoroethylene, perfluoroalkoxy alkanes, and polyvinylidene fluoride, and mixtures thereof.

* * * * *